United States Patent [19]

Butts et al.

[11] Patent Number: 5,407,520
[45] Date of Patent: Apr. 18, 1995

[54] WELDING ROD

[75] Inventors: Ernest O. Butts, Ottawa; Nicholas E. Butts, Kanata; Robert Pinder, Ottawa, all of Canada

[73] Assignee: E. O. Butts Consultants Ltd., Nepean, Canada

[21] Appl. No.: 144,303

[22] Filed: Oct. 28, 1993

Related U.S. Application Data

[60] Division of Ser. No. 95,936, Jul. 22, 1993, which is a continuation of Ser. No. 941,662, Sep. 8, 1992, abandoned, which is a continuation-in-part of Ser. No. 698,243, May 6, 1991, abandoned, which is a continuation of Ser. No. 456,576, Dec. 29, 1989, abandoned, which is a continuation-in-part of Ser. No. 152,016, Feb. 3, 1988, abandoned.

[51] Int. Cl.$^6$ .............................................. B32B 31/00
[52] U.S. Cl. ............................ 156/379.7; 156/393; 156/503; 156/274.2; 156/149; 285/21; 219/544; 219/547
[58] Field of Search ............ 156/148, 149, 273.9, 156/274.2, 379.6, 380.2, 379.7, 393, 503; 219/56, 541, 544, 546, 547; 285/21, 187, 260

[56] References Cited

U.S. PATENT DOCUMENTS

| | | | |
|---|---|---|---|
| 2,915,110 | 12/1959 | Ferguson et al. | 156/148 |
| 2,983,306 | 5/1961 | Resnick | 154/42 |
| 3,047,703 | 7/1962 | Aske | 156/273.9 |
| 3,798,094 | 3/1974 | Costa | 156/69 |
| 3,945,867 | 3/1976 | Heller, Jr. et al. | 156/274.2 |
| 3,954,541 | 5/1976 | Landgraf | 156/275 |
| 4,005,168 | 1/1977 | Whitfill, Jr. et al. | 156/274.2 |
| 4,117,311 | 9/1978 | Sturm | 219/544 |
| 4,176,274 | 11/1979 | Lippera | 219/522 |
| 4,525,230 | 6/1985 | Hetzel et al. | 156/244.12 |
| 4,629,216 | 12/1986 | Pedersen | 285/21 |
| 4,743,320 | 5/1988 | Shaw | 156/69 |
| 4,851,647 | 7/1989 | Kuhling | 219/535 |
| 4,933,037 | 6/1990 | de Jong | 156/166 |
| 4,952,262 | 8/1990 | Washkewicz et al. | 156/273.9 |

FOREIGN PATENT DOCUMENTS

| | | | |
|---|---|---|---|
| 1072800 | 3/1954 | France . | |
| 1416207 | 9/1965 | France . | |
| 3204681 | 8/1983 | Germany | 156/274.4 |
| 54-23029 | 8/1979 | Japan | 156/274.2 |
| 56-161116 | 12/1981 | Japan | 156/274.2 |
| 336980 | 4/1959 | Switzerland | 156/274.2 |

*Primary Examiner*—Chester T. Barry
*Attorney, Agent, or Firm*—Foley & Lardner

[57] ABSTRACT

An improved welding rod having a solid homogeneous core of thermoplastic material and a resistance element comprised of a plurality of wires is presented with a method and apparatus for forming the welding rod. The welding rod is positioned between members of the thermoplastic material to be welded and a current and pressure is applied to the resistance element causing the thermoplastic material of the solid core and the adjacent thermoplastic members to fuse and form a unitary weld. Simultaneously the electrical resistance element is embedded in the weld, mechanically reinforcing and strengthening the connection. There is also disclosed a method for electric fusion welding of thermoplastic members wherein the welding rod is pre-attached to one of the thermoplastic members.

16 Claims, 7 Drawing Sheets

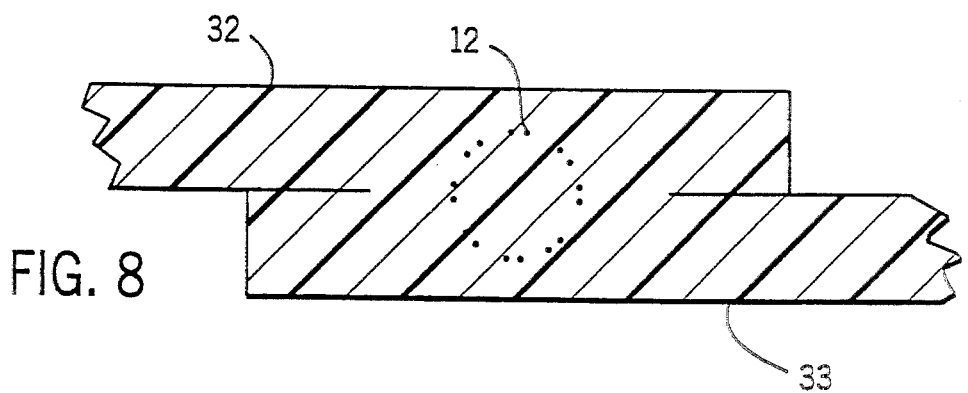
FIG. 8
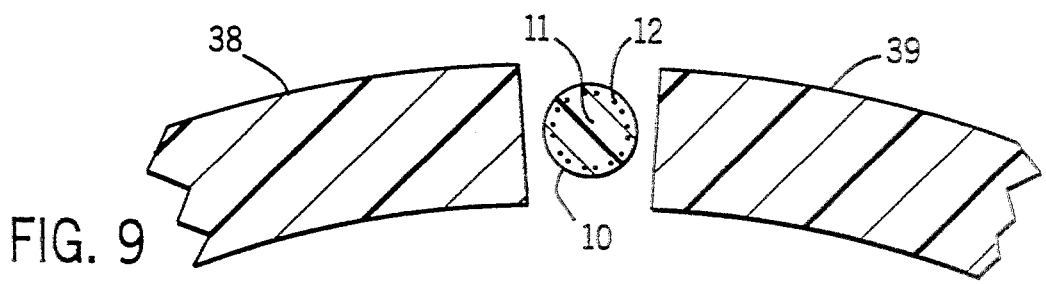
FIG. 9
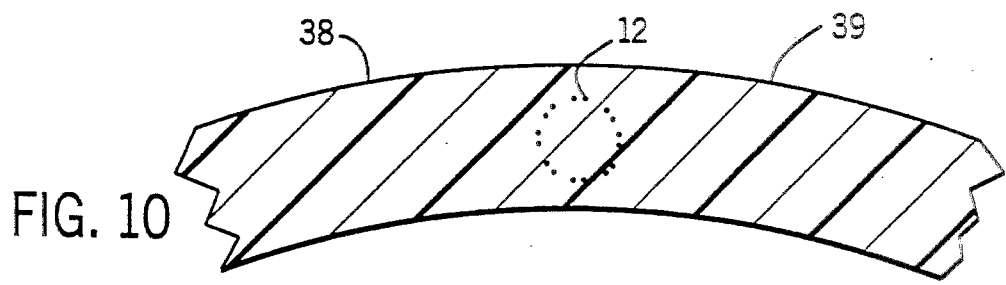
FIG. 10
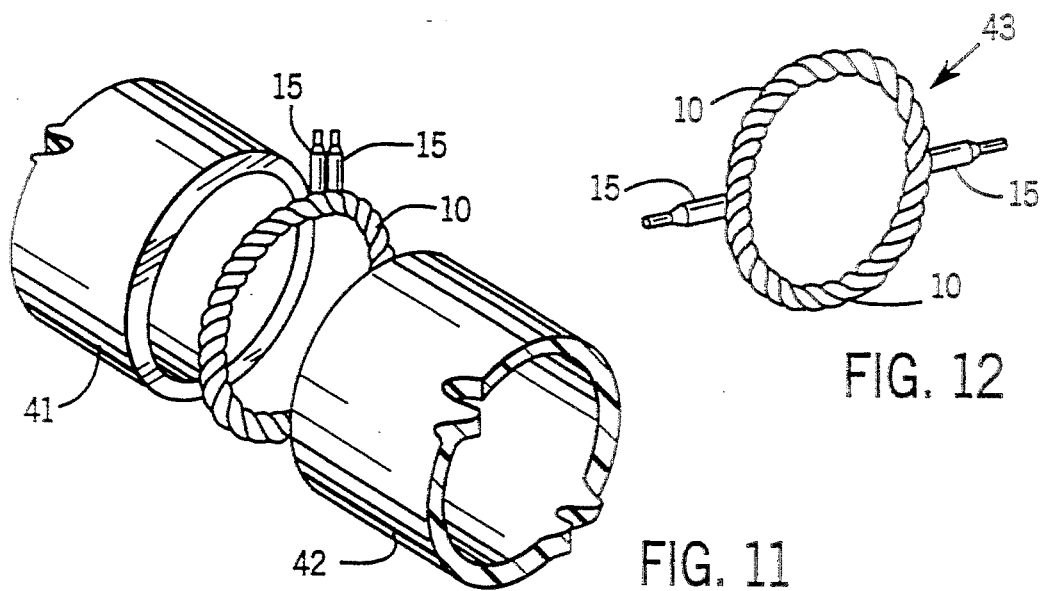
FIG. 11
FIG. 12

WELDING ROD

This is a divisional of Ser. No. 08/095,936, filed on Jul. 22, 1993, which is a continuation of Ser. No. 07/941,662, filed on Sep. 8, 1992, now abandoned, which is a continuation-in-part of Ser. No. 07/698,243, filed on May 6, 1991, abandoned, which is a continuation of Ser. No. 07/456,576, filed on Dec. 29, 1989, abandoned, which is a continuation-in-part of Ser. No. 07/152,016, filed on Feb. 3, 1988, abandoned.

FIELD OF THE INVENTION

The present invention relates to the welding of members of thermoplastic materials including polyethylene, polyvinyl chloride, nylons, polyhpropylene, acetals, and the like.

BACKGROUND OF THE INVENTION

Thermoplastic materials including polyethylene, polyvinyl chloride, nylons, polypropylene, acetals, and the like have become increasingly important as materials of construction because of their moldability, ease of handling, light weight, and ability to withstand corrosion.

In many applications however, mechanical joints such as threaded joints are unacceptable because they are not fluid-tight. This is particularly of concern in the handling of hazardous materials and waste.

Numerous techniques have therefore been developed for the joining of thermoplastic materials including welding and the use of adhesives. The use of adhesives or solvents for making joints in plastic pipe etc. is inconvenient in field applications where conditions are not ideal and where the time and other factors required to develop the maximum bond strength may not be available. Moreover, it may be impossible to find a suitable adhesive for the thermoplastic material.

Polyethylene has in the past been welded by techniques such as extrusion welding using a tool which applies heat to overlapped sheets of the thermoplastic material, and extrudes a bead of thermoplastic material at the edge of the lap. The bead of thermoplastic material is intended to fuse with the preheated sheets of the thermoplastic to form a liquid fusion of the two sheets and the extrudate to weld the overlapped sheets. This technique has not proven entirely satisfactory in practice because of a lack of uniformity in the welding process especially where hand held extrusion welding tools are used on large sheets of material.

Another technique known in the prior art involves the use of a so-called "speed-tip" for welding sheets of thermoplastic material in which a welding rod of the thermoplastic material is fed through the nozzle of a hot air gun. The stream of hot air together with the melted thermoplastic are applied to the area to be welded. Once again problems of uniformity and completeness of weld are evident. Frequently such welds include pinholes or unwelded portions and can also include portions in which excess heat has been applied and the thermoplastic material damages. Obviously, damaged and incomplete welds are most undesirable.

A further technique utilizes a hot wedge which is passed between the sheets of thermoplastic material to heat the opposite faces which are then pressed together to form a bond.

A number of electrically heated techniques for forming either lap or butt welds between two members of a thermoplastic material have been attempted in the past. One technique involves the use of a bare wire or metal strip which is placed between the two members of thermoplastic material. This method is disclosed in the teachings of the following U.S. Pat. Nos. 2,243,506 (Mitchell), 2,647,072 (Smith), 2,742,390 (Beck), 2,974,566 (Hurley), 3,049,465 (Wilkins), 3,061,503 (Gould), 3,348,640 (Thompson), 4,416,713 (Brooks), 4,176,274 (Lippera), and 4,375,591 (Sturm).

The present inventors have had experience in the welding of thermoplastic members without the supply of new material and have found that the wire can actually burn holes in the thermoplastic material of the members being welded. Accordingly it is very important to supply new material when welding two thermoplastic members.

Some other forms of welding rods have been disclosed in which wire or metal strips are coated in a relatively thick layer of thermoplastic material. This type of welding rod is disclosed in the following patents: U.S. Pat. No. 2,983,306 (Resnick), U.S. Pat. No. 3,506,519 and CA 837,562 (Blumenkranz), U.S. Pat. No. 3,378,672 and CA811,837 (Blumenkranz), and FR 1.072.800.

The present inventors have found that this type of welding rod results in the element being too remote from the surfaces to be welded. The plastic immediately surrounding the wire or metal strips burns before the material of the thermoplastic members melts. The weld, if formed, is of poor quality.

French patent number 1.072.800 also describes the use of an adhesive to hold the welding rod in place on one sheet before applying the second sheet and welding the sheets together. The present inventors have tried this method of holding the welding rod in place. They have found that the use of adhesives or double-sided tape adversely affects the integrity of the weld because the adhesive and double-sided tape act as a contaminants. These contaminants prohibit the intermolecular bonding that is desired between the thermoplastic members being joined and the welding rod.

Many of the prior art techniques have only limited applications and are limited to the welding of certain shapes.

SUMMARY OF THE INVENTION

The present invention aims to overcome the disadvantages of the prior art by providing an improved welding rod, a method and apparatus for forming the welding rod, and methods of use of the welding rod. The welding rod is formed of a resistance element and a solid homogeneous core of thermoplastic material which provides a supply of thermoplastic material to the weld between two adjacent thermoplastic members. The resistance element is formed of a number of wires either wrapped in a helical pattern or braided around the solid core.

The resistance element is then embedded in he solid core to draw the wires just below the surface of the solid core. Alternatively, the resistance element and the solid core are coated in a thin layer of thermoplastic material. The welding rod of the present invention provides a better distribution of heat and reduces the risk of overheating and burning of the thermoplastic, both of the solid core and the members being joined, which can adversely affect the quality of the weld. A double welding rod is also disclosed which can be formed into a variety of shapes to adapt to many different applications.

In use the welding rod is positioned between the thermoplastic members to be welded and an electrical current is applied to the resistance element. Simultaneously, the members to be welded are pressed together. The electrical current is applied for a time and at an intensity to cause the solid core and portions of the thermoplastic material of the adjacent members to soften and fuse thereby welding the two members together. The resistance element forms a mechanical reinforcement in the weld thereby rendering a superior weld between the thermoplastic members.

There is also disclosed a method for welding of adjacent members of thermoplastic material wherein the welding rod is pre-attached to one of the adjacent members of thermoplastic material.

The welding rod and process for electric fusion welding of the present invention is very versatile, providing a means for the welding together of different shapes and sizes of thermoplastic members.

BRIEF DESCRIPTION OF THE DRAWINGS

In the accompanying drawings which illustrate embodiments of the present invention.

FIG. 8 is a cross-sectional view of the completed weld of FIG. 7, FIG. 9 illustrates a butt weld between curved members such as for a longitudinal butt weld on a pipe, FIG. 10 illustrates the weld of FIG. 9 on completion, FIG. 11 is a perspective view illustrating the use of the invention in performing a transverse butt weld on piping, FIG. 12 is a perspective view of an alternative embodiment of the welding rod of FIG. 11.

DESCRIPTION OF THE PREFERRED EMBODIMENTS

Figure 1:
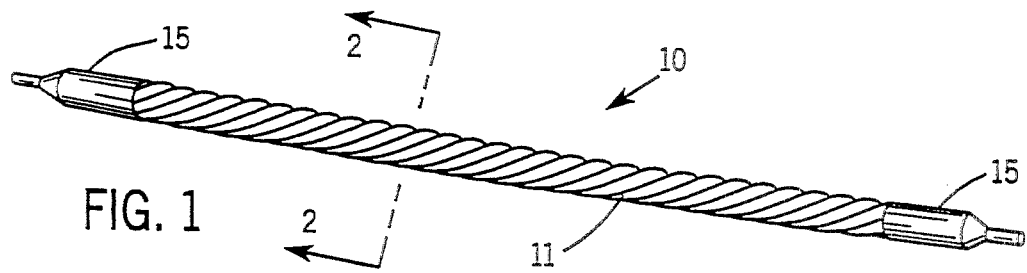
FIG. 1 is a perspective view of a welding rod in accordance with the present invention.
Figure 2:
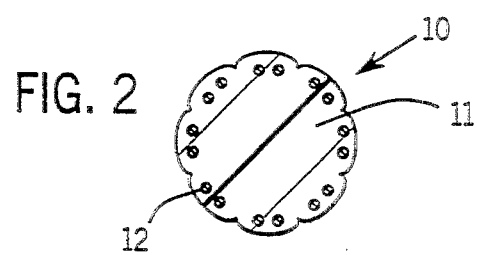
FIG. 2 is a cross-sectional view of the welding rod of FIG. 1 taken along the line 2—2.

FIGS. 1 and 2 illustrate the welding rod 10 of the present invention. The welding rod 10 is formed of a solid core 11 of thermoplastic material and a resistance element 12. The resistance element 12 is connected to terminal pins 15 at each end of the welding rod 10 for subsequent connection to a power supply (not shown).

The choice of materials and the dimensions of the solid core 11 and the resistance element 12 are dependent on the requirements of a particular application. For example the solid core 11 may be formed of thermoplastic materials including polyethylene, polyvinyl chloride, nylons, polypropylene, acetals, and the like. In turn, the resistance element 12 may be formed of conducting metals including stainless steel, nichrome, iron, tin-copper alloy, and the like.

For the purposes of this description, the solid core 11 is formed of high density polyethylene (HDPE) and the resistance element 12 is formed of stainless steel. The dimensions of the solid core 11 and the resistance element 12 presented in this discussion are chosen to provide a preferred embodiment of the present invention. It will be understood that these dimensions and the operating parameters discussed hereinafter are dependent on the particular application and the choice of materials.

In the prior art "speed-tip" technique of joining thermoplastic members discussed above, a welding rod of thermoplastic material is fed through a nozzle. One type of this prior art welding rod is an extruded HDPE rod having a diameter of 5 millimeters. This welding rod is an ideal solid core 11 for the present invention. The solid core 11 should be homogeneous and free of any significant voids as discussed hereinafter.

To form the welding rod 10 with the 5 millimeter diameter HDPE solid core 11, the resistance element 12 is comprised of sixteen strands of stainless steel wire 17 having a diameter of 0.006 inch. As shown more clearly in FIG. 4, the wires 17 are wound in eight pairs in a helical pattern around the solid core 11. The size and number of wires 17 of the resistance element 12 are factors which dictate the length of this helical pattern along the length of the solid core 11. In the present example, one revolution of a pair of wires 17 is approximately 1.25 inches long. In all cases the configuration of the resistance element 12 should provide a distribution of energy from the power source to cause uniform heating of the solid core 11.

Often the limiting factor in the use of the welding rod 10 is the voltage permissible at the welding site. For safety reasons the voltage is often limited to a maximum of 120 volts. Accordingly the current is dependent on the resistance of the resistance element 12. One relatively large diameter wire 17 cannot be used as a resistance element 12 since it would tend to overheat and cause the solid core 11 to burn. By using a number of smaller diameter wires 17 distributed evenly around the solid core 11, there is better heat distribution in the solid core 11 without overheating and greater lengths of welds are achievable than would be possible with a single conductor.

Once the wires 17 are wound around the solid core 11, the resistance element 12 is embedded in the solid core 11 by holding the wires 17 in tension while softening the surface of the solid core 11 so that the wires 17 are drawn below the surface of the solid core 11. By embedding the resistance element 12, it is not exposed to the atmosphere on the surface of the solid core 11. If the resistance element 12 is exposed to the atmosphere when connected to a power source, a hot spot can be created and the thermoplastic material of the solid core 11 and the thermoplastic members being welded will be burned. There are also advantages in the handling of the welding rod 10 having an embedded resistance element 12. It will be understood by those skilled in the art that the wires 17 might catch and get tangled if they are exposed on the surface of the solid core 11. Furthermore, the exposed wires 17 are more likely to get covered by dirt, grease, and other contaminants which could adversely affect the quality of the weld. A welding rod 10 which has an embedded resistance element 12 is more readily cleaned of these contaminants.

While it is desirable to embed the resistance element 12 in the solid core 11, it is also desirable to control the depth of the embedding. If the resistance element 12 is embedded too deeply, the element 12 is too remote from the surfaces being welded. The thermoplastic material immediately surrounding the resistance element 12 will burn before the thermoplastic material of the members being joined can soften, resulting in a poor weld. Moreover, the sixteen strands of wire 17 would then begin to act as one larger diameter wire which is also unacceptable as it could cause overheating and therefore burning of the thermoplastic material of the solid core 11. Preferably the resistance element 12 is embedded just below the surface of the solid core 11.

Figure 3:
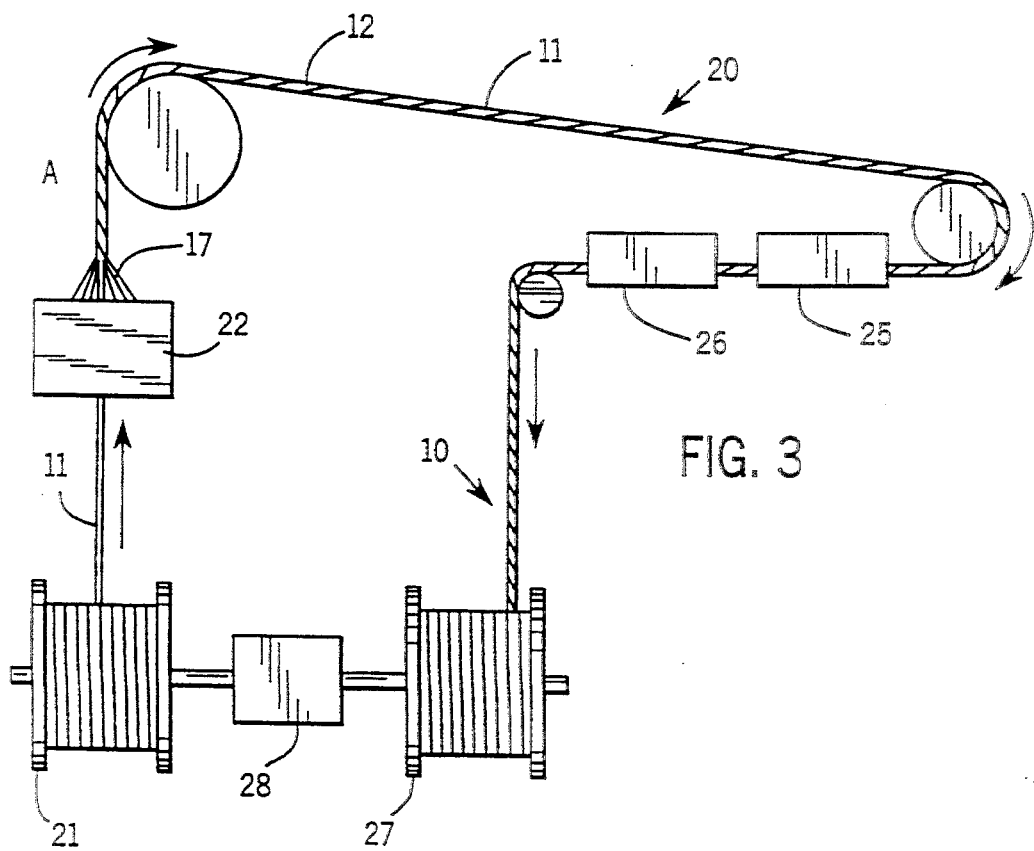
FIG. 3 is a schematic diagram of an apparatus for forming the welding rod.
Figure 4:
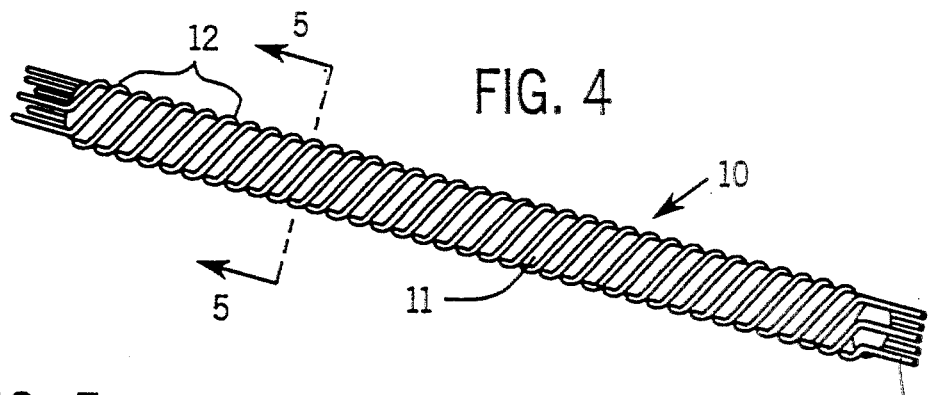
FIG. 4 is a perspective view of a welding rod at stage A of production shown in FIG. 3.
Figure 5:
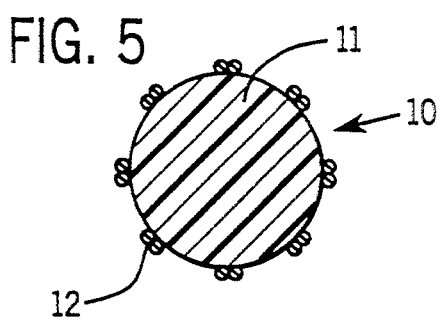
FIG. 5 is a cross-sectional view of the welding rod of FIG. 4.

FIG. 3 illustrates schematically an apparatus 20 which can be used to form the welding rod 10. The solid core 11 is uncoiled from a core spool 21 and drawn through a wire winding machine 22. The wire winding machine 22 winds sixteen wires 17 in eight pairs in a helical pattern about the solid core 11. One revolution of a helix of a pair of wires 17 is approximately 1.25 inches long. FIGS. 4 and 5 show the welding rod 10 in more detail at stage A of the process of forming the welding rod 10 with the wires 17 wound in a helical pattern about the solid core 11.

The solid core 11 and the resistance element 12 are held in tension and drawn through a heating chamber 25. The tension of the wires 17 and the softening of the solid core 11 cause the resistance element 12 to be drawn below the surface of the solid core 11. Subsequently the welding rod 10 is drawn through a cooling chamber 26 and wound on a welding rod spool 27. In this continuous process of forming the welding rod 10, it is advisable to engage the movement of the core spool 21 with the welding rod spool 27 by a common drive mechanism 28 so that the appropriate tension is maintained throughout the process.

An example of the operating parameters of the apparatus 20 is: the solid core 11 is unwound from the core spool 21 at a rate of 6 to 7 feet/minute; the heating chamber 25 is controlled at a temperature of 400° C. and has a length of 1.5 feet; and the cooling chamber 26 is a water bath controlled at a temperature of 38° C. and has a length of 1.0 foot.

As shown in FIG. 1, the welding rod 10 has a spiral pattern on its surface defining the path of the resistance element 12 as it is embedded in the softened solid core 11. If desired the apparatus 20 can be adapted to include a die (not shown) after the heating chamber 25 to smooth the surface of the welding rod 10 or to mold the welding rod 10 into another shape.

The resistance element 12 could also be formed of wires 17 braided around the solid core 11.

The apparatus 20 could also be adapted to replace the heating chamber 25 with a cross-head extruder (not shown) to apply a thin coating of thermoplastic material over the resistance element 12. This adaptation is particularly useful when the resistance element 12 is braided around the solid core 11 and/or when the solid core 11 is formed of a relatively soft material such as polyvinyl chloride.

Some methods of producing the solid core 11 use a fast cooling cycle of the thermoplastic extrudate. However, if the core 11 of the core 11 is hardened while the interior is still molten so that voids are formed in the interior of the core 11. Accordingly, as the core 11 is heated in the heating chamber 25 of the apparatus 20 during formation of the welding rod 10, the core 11 collapses at the voids so that the quality of the welding rod 10 is adversely affected. Preferably, the solid core 11 should be homogeneous and free of any significant voids.

In preparation of the welding rod 10 for use in the welding together of thermoplastic members, the required length of welding rod 10 is cut from the welding rod spool 27 and the terminal pins 15 are attached to the resistance element 12 at each end of the welding rod 10.

Figure 6:
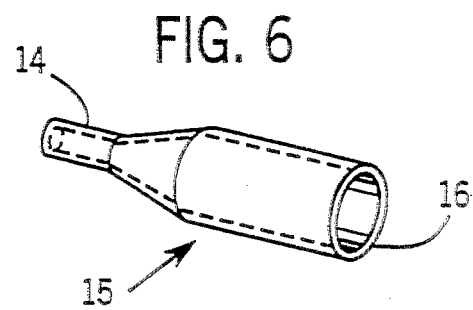
FIG. 6 is a perspective view of a terminal pin.

As shown in FIG. 6, the substantially trumpet-shaped terminal pin 15 could be formed of a thin-walled brass tube. Preferably the terminal pin 15 has a mouth 16 of a diameter slightly less than that of the welding rod 10. The terminal pin 15 is heated and the end of the welding rod 10 is forced into the mouth 16 of the terminal pin 15. As the welding rod 10 is further forced into the neck 14 of the terminal pin 15, the thermoplastic material of the solid core 11 is stripped from the resistance element 12. The terminal pin 15 is then crimped onto the resistance element 12 at the neck 14.

Alternatively, a portion of the resistance element 12 at each end of the welding rod 10 is exposed by heating and stripping approximately ¼ inch of the solid core 11 from each end of the welding rod 10 using, for example, a hot air gun and a pair of wire strippers. The exposed wires 17 of the resistance element 12 are then twisted together and a terminal pin 15 is connected to the resistance element 12. After the terminal pin 15 is attached, the thermoplastic at the base of the terminal pin 15 is reheated and the softened thermoplastic is pushed over the base of the terminal pin 15.

These methods of attaching the terminal pin 15 ensure that the resistance element 12 is not exposed to the atmosphere when connected to a power source thereby preventing overheating of the welding rod 10 at that point during welding due to the lack of thermoplastic material to absorb the heat. If these steps are not taken, the thermoplastic material of the members being welded will burn rather than soften on contact with the resistance element 12.

The welding rod 10 is very versatile and can be bent and formed into essentially any shape to effect welding of thermoplastic members. For example, the welding rod 10 can be used to fuse tubular or planar thermoplastic members with butt or lap joints.

Figure 7:
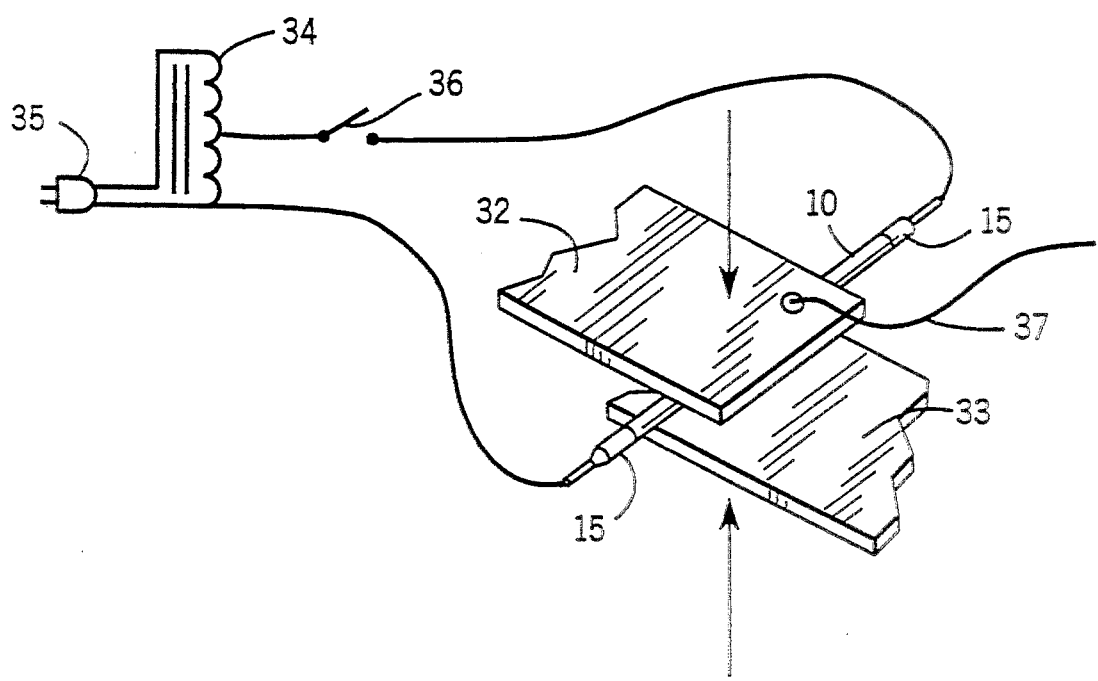
FIG. 7 illustrates the general procedure used to form a lap joint of thermoplastic material using the welding rod of FIG. 1.

FIG. 7 illustrates the general procedure for forming a welded lap joint between thermoplastic members. A pair of sheets of thermoplastic material 32 and 33 are positioned on either side of a welding rod 10. A variable voltage transformer 34 is connected to a source of power at 35 and further connected via a suitable switch 36 to the resistance element 12 through the terminal pins 15.

An electrical current is passed through the resistance element 12 and simultaneously pressure is applied above and below on the sheets 32 and 33. As the electrical current passes through the resistance element 12, the solid core 11 and the thermoplastic material of the thermoplastic sheets 32 and 33 in the vicinity of the welding rod 10 begin to soften. The electrical current is continued for a time and intensity to cause the thermoplastic material of the welding rod 10 and the thermoplastic sheets 32 and 33 to soften and melt. After the electrical current is discontinued, the application of pressure above and below the thermoplastic sheets 32 and 33 is continued so that the solid core 11 and the two thermoplastic sheets 32 and 33 fuse and solidify thereby forming a unified weld. The resistance element 12 remains in the weld and reinforces or "stitches" the weld mechanically. Another advantage to having the resistance element 12 in place in the weld is to allow reheating of the weld in the event of a weld failure due to insufficient heat or pressure application during the initial weld cycle.

FIG. 8 is a cross-sectional view of the weld formed by the process illustrated in FIG. 7. As can be seen from this cross-sectional view, the material of the solid core 11 is now indistinguishable from the welded material of the sheets 32 and 33, and the weld is reinforced by the resistance element 12 embedded therein.

FIG. 9 illustrates a butt weld between curved members 38 and 39 of, for example, a longitudinally slit thermoplastic pipe. The welding rod 10 is positioned between the curved members 38 and 39. Pressure is applied to urge the edges of the curved members 38 and 39 into contact and an electrical current is passed through the resistance element 12. The weld is completed when the welding rod 10 and curved members 38 and 39 are fused and the resistance element 12 is embedded in the weld. The structure of the weld is such that the solid core 11 becomes part of the body of material of the two curved members 38 and 39 that are joined and the weld is simultaneously reinforced by the presence of the resistance element 12. This latter completed configuration of the butt weld is illustrated in FIG. 10.

FIG. 11 is a perspective view illustrating the manner in which a pair of tubular thermoplastic members, 41 and 42, such as sections of piping, can be welded end to end with a butt joint. The welding rod 10 is formed into a ring shape and is positioned between the tubular members 41 and 42. An electrical current is passed through the resistance element 12 and the tubular members 41 and 42 are pressed together to complete the weld.

Alternatively, referring to FIG. 12, a welding ring 43 is used to weld the tubular thermoplastic members, 41 and 42. The welding ring 43 is formed of two welding rods 10, each having a length slightly longer than half of the circumference of the tubular thermoplastic members 41 and 42. The resistance element 12 is exposed at each end of the welding rods 10 by heating and stripping the solid core 11 using, for example, a hot air gun and a pair of wire strippers, so that the length of each welding rod 10 is then approximately equal to half of the circumference of the tubular members 41 and 42.

The exposed wires 17 of the resistance element 12 at a first end of the first welding rod 10 are then twisted together with the exposed wires 17 of the resistance element 12 at a first end of the second welding rod 10. Further, the exposed wires 17 of the second ends of the fist and second welding rods 10 are also twisted together to form a double welding rod (not shown). The terminal pins 15 are subsequently attached to the resistance element 12. The welding rods 10 are then pulled apart without separating them from the terminal pins 15, to form the welding ring 43. This type of welding ring 43 is particularly useful in the welding together of large diameter thermoplastic pipe sections and in situations where the available voltage is limited.

The power supply used to effect electrofusion welding of thermoplastic members with the welding rod 10 of the present invention preferably offers control of the current in the range of 0 to 20 amperes. Often the limiting factor in the use of the welding rod 10 is the voltage permissible at the welding site. For safety reasons the voltage is often limited to a maximum of 120 volts. The voltage then becomes the limiting factor to the length of the weld that can be achieved.

For example, a 6 inch weld will take the same length of time to complete as a 30 foot weld at the same current using a 4 volt and a 240 volt source, respectively. Furthermore, the length of time required to complete a weld can be varied by changing the current; at lower amperages the required welding time is increased. Generally, the integrity of the weld benefits by using lower amperages for longer periods of time because the heat distribution is improved and overheating of the thermoplastic of the welding rod 10 and the thermoplastic members is less likely.

Preferably, the welding process is conducted at a current between 6 amperes and 15 amperes for the single welding rod 10, and between 12 amperes and 20 amperes for the double welding rod (not shown) or the welding ring 43. The length of time required to effect the weld may be determined by using a temperature probe 37 placed, for example, on the upper surface of the thermoplastic sheet 32 in FIG. 7, directly over the welding rod 10. When the temperature probe 37 indicates that the temperature has reached 120° C., the power source 35 is disconnected and the weld is allowed to fuse and solidify while the weld is still under pressure. The thickness of the thermoplastic sheet 32 and the resulting temperature gradients must be compensated for in the determination of temperature as the probe 37 will take longer to detect the temperature when thicker pieces of thermoplastic are welded. It will be understood by those skilled in the art that the conditions at the welding site will affect the time required to complete the welding operation. A single welding rod 10 might require a welding time of eight minutes at 6 amperes or two minutes at 12 amperes.

An alternative approach to the method of welding described herein is to substitute the 0.006 inch stainless steel wire 17 of the resistance element 12 with 0.008 inch magnetic wire and to use a radio frequency (RF) generator (not shown) to induce a current in the magnetic wire. This method enables the completion of very long welds by simply sliding the RF generator coil along the length of the weld rather than having to supply a series of terminal pins 15 for connection to an electrical power source at various points along the weld.

It is important to apply pressure to the weld during the welding operation. If the welding rod 10 is simply placed between the thermoplastic sheets 32 and 33, it will "snake" or move out of position on application of electrical current. A weight (not shown) placed on the weld holds the thermoplastic sheets 32 and 33 and the welding rod 10 in relative position to each other. Furthermore, it is important to maintain the pressure until the weld is fused and solidified. Depending on the situation the weld should generally be left to cool under pressure for approximately four minutes. If the pressure is discontinued before the thermoplastic material has solidified, the sheets 32 and 33 and the welding rod to will, in fact, tend to separate from each other while in the softened state.

Preferably the weight has a relatively soft base which will conform to the surface of the member being welded. A rigid surface on the base of the weight can effect unequal pressure on both sides of the weld. This problem is compounded if the underlying surface is uneven. The weight should be designed to distribute the load equally along the length of the weld particularly in the case of a relatively long weld. The design of the weight can incorporate an insulating effect allowing welds to be completed at ambient temperature below 40 C.

For example, the base of the weight may be comprised of a length of plywood (¾ inch thick and 4 inches wide) having a layer of ½ inch thick neoprene rubber attached to its underside. The base is placed over the weld and weights of, for example, 10 pounds per linear foot are then placed on the base. This arrangement provides even distribution of pressure over the length of the weld.

It is often desirable to pre-attach the welding rod 10 to one of the thermoplastic members to be welded. The present inventors however, have found that the use of adhesives or double-sided tape to hold the welding rod 10 in position adversely affects the integrity of the weld because the adhesive and double-sided tape act as contaminants which prohibit the desired intermolecular bonding between the thermoplastic members being joined and the welding rod 10.

Figure 13:
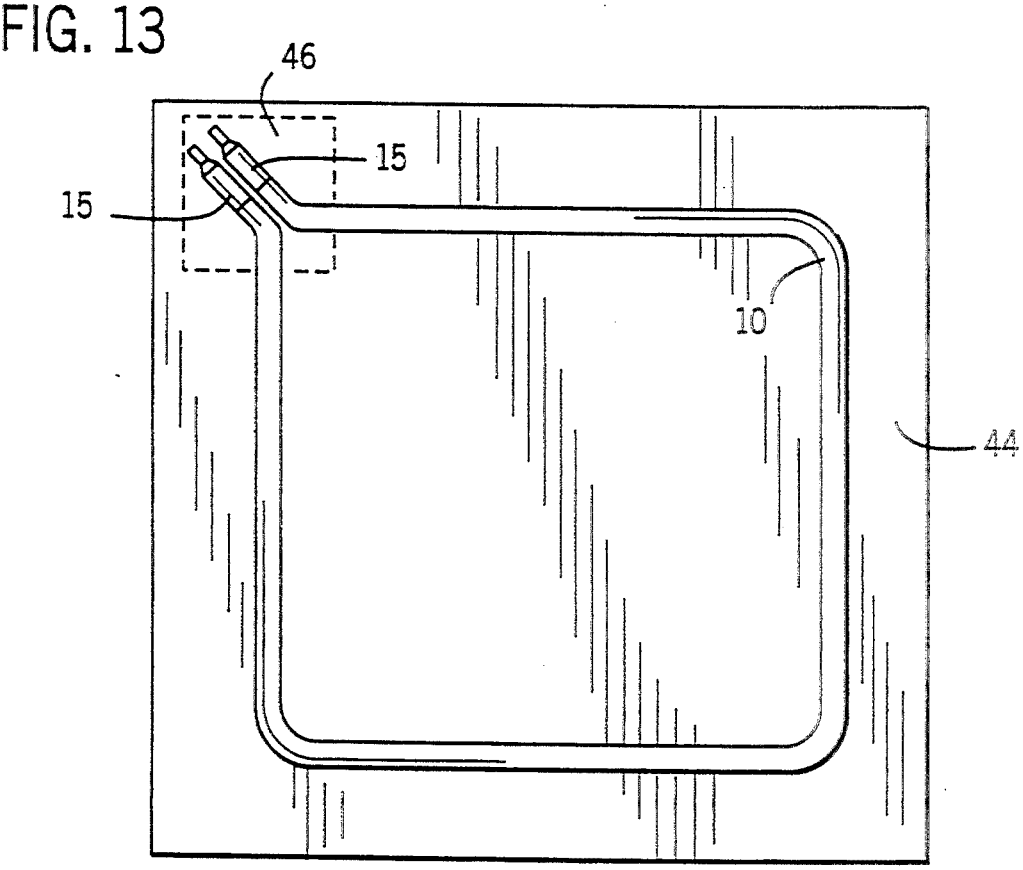
FIG. 13 is a top plan view of a welding rod pre-attached to a thermoplastic member.

Accordingly, the welding rod 10 should be held in position by fusing the welding rod 10 in part or in whole, to one of the two thermoplastic members to be joined. Referring now to FIG. 13, the length of welding rod 10 can be pre-attached, in any desired shape, to the thermoplastic member 44 either with or without the terminal pins 15 connected to the resistance element 12. This can be done, for example, by using a hot air gun and the prior art "speed-tip" technique to soften the thermoplastic material of the solid core 11 and to tack the welding rod 10 in place.

Figure 14:
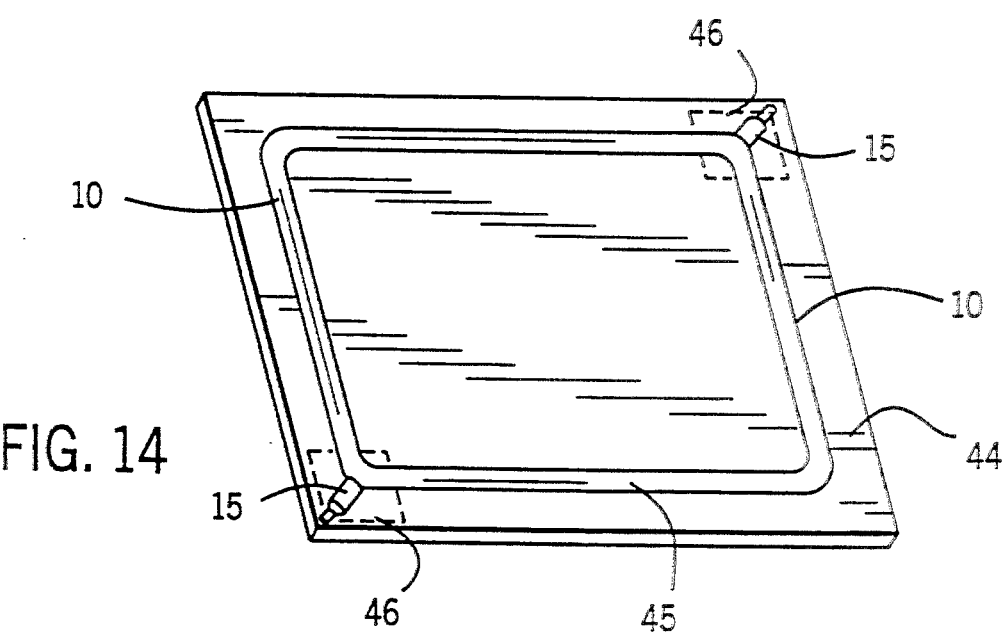
FIG. 14 is a perspective view of an alternative embodiment of a welding rod pre-attached to a thermoplastic member.

Referring now to FIG. 14 which illustrates the pre-attaching of FIG. 13 with an alternative embodiment of the welding rod 10 formed into a patch welding rod 45. This particular patch welding rod 45 is formed in the same manner as the welding ring 43 discussed previously and is particularly useful for patching holes in sheets of thermoplastic material.

The patch welding rod 45 is formed of two welding rods 10 substantially equal in length. The resistance element 12 is exposed at each end of the welding rods 10 by heating and stripping the solid core 11 using, for example, a hot air gun and a pair of wire strippers. The exposed wires 17 of the resistance element 12 at a first end of the first welding rod 10 are then twisted together with the exposed wires 17 of the resistance element 12 at a first end of the second welding rod 10. The exposed wires 17 of the second ends of the first and second welding rods 120 are then twisted together to form a double welding rod (not shown). The terminal pins 15 are attached to the resistance element 12 and the patch welding rod 45 is formed into the desired shape by pulling apart the pair of welding rods 10 without separating them from the terminal pins 15. The patch welding rod 45 is then pre-attached to the thermoplastic sheet 44 by simultaneously applying a current and pressure.

In both of the applications shown in FIGS. 13 and 14, it is preferable to pre-attach the rods 10 and 45, respectively, so that the terminal pins 15 do not extend beyond the edge of the thermoplastic member 44 thereby preventing overheating of the exposed metal of the terminal pins 15. This is also a safety feature as contact with the terminal pins 15 can result in an electrical shock.

In applications as shown in FIG. 14 where two welding rods 10 are connected at a terminal pin 15, there may be a localized overheating of the patch welding rod 45 at the terminal pins 15. In this case it is advisable to provide, for example, pieces of foil tape 46 on the opposite side of the thermoplastic sheet 44. The foil tape 46 acts to draw off the heat from the terminal pin 15 and conducts it over the area of the foil tape 46 to prevent burning of the thermoplastic material immediately adjacent the terminal pin 15.

An alternative to pre-attaching the welding rod 10 is to provide a channel (not shown) in one of the thermoplastic members to be joined to hold the welding rod 10 in place during the welding operation.

Figure 15:
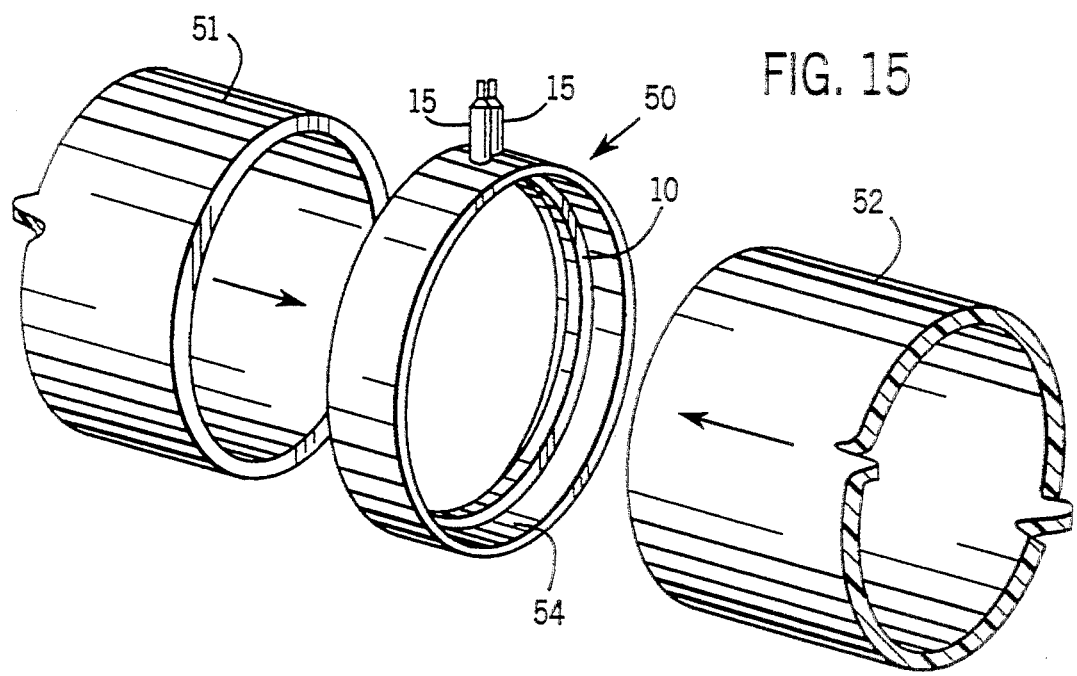
FIG. 15 is a perspective view illustrating the use of a fusion ring for a transverse butt weld with a socket fitting of pipe sections.
Figure 16:
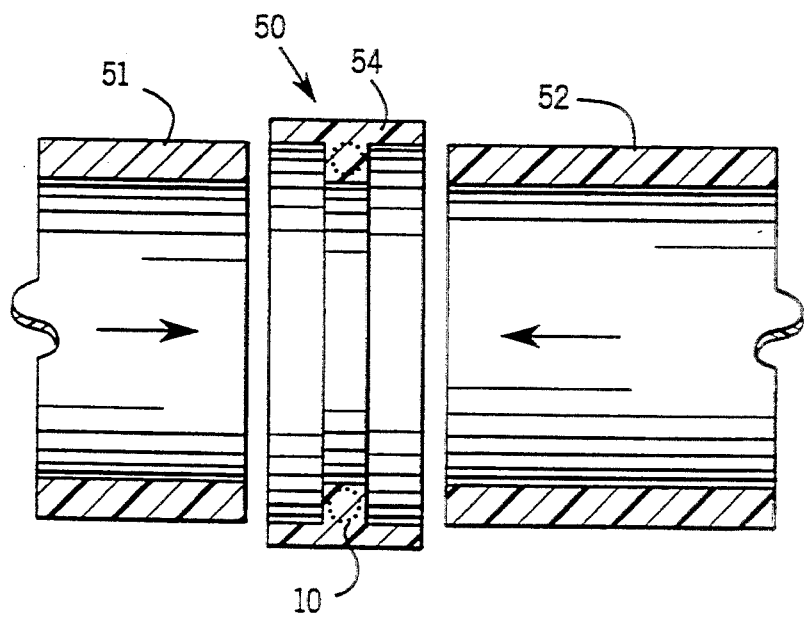
FIG. 16 is a cross-sectional view of FIG. 15.

Referring now to FIGS. 15 and 16, an application of the welding rod 10 and the process of forming a weld between two thermoplastic members is a fusion ring 50 for welding together two sections of pipe 51 and 52 with a butt joint.

The fusion ring 50 is formed of a welding rod 10 and a collar 54 of thermoplastic pipe having an inside diameter substantially equal to the outside diameter of the sections of pipe 51 and 52 being joined. The distance between the mouths 16 of the terminal pins 15 of the welding rod 10 is substantially equal to the inside circumference of the collar 54. The welding rod 10 is shaped along the inside surface of the collar 54 and the terminal pins 15 are pushed to the outside through holes in the collar 54.

The welding ring 53 is then pre-attached to the inside wall of the collar 54. The shaping and pre-attaching of the welding rod 10 can be done, for example, with a pair of non-conductive, heat resistant rings (not shown) which are pressed together as a current is passed through the resistance element 12 of the welding rod 10.

The fusion ring 50 is positioned between the two sections of pipe 51 and 52 as in a socket fitting and the two sections of pipe 51 and 52 are then welded together while pressure is applied to push the pipes 51 and 52 together. The fusion ring 50 supplies a third thermoplastic member in the form of a collar 54 to the weld. This is particularly advantageous in situations where containment of the fluids transported in the pipe 51 and 52 is a priority.

Figure 17:
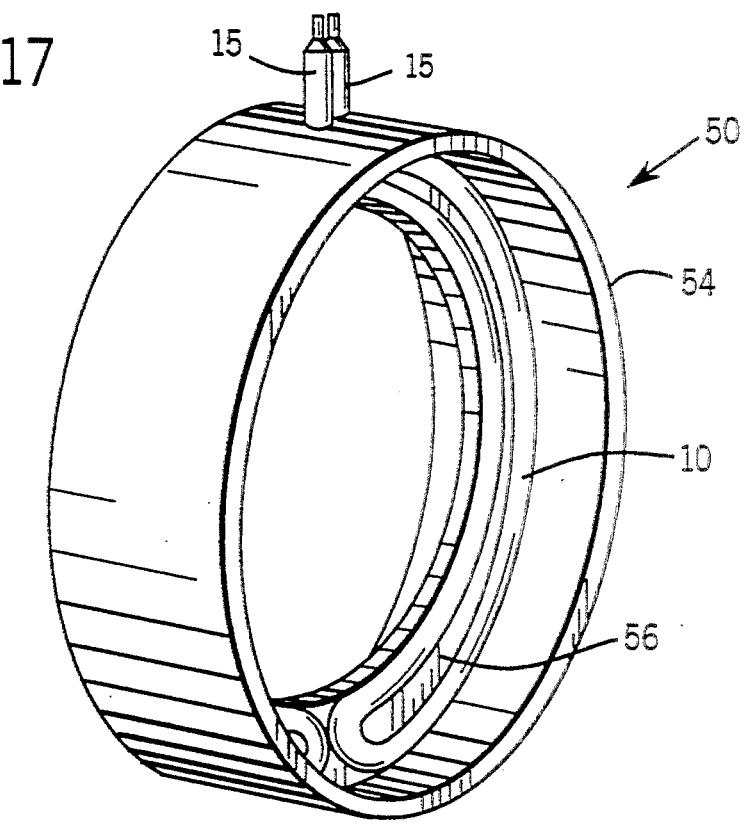
FIG. 17 is a perspective view of an alternative embodiment of the fusion ring.
Figure 18:
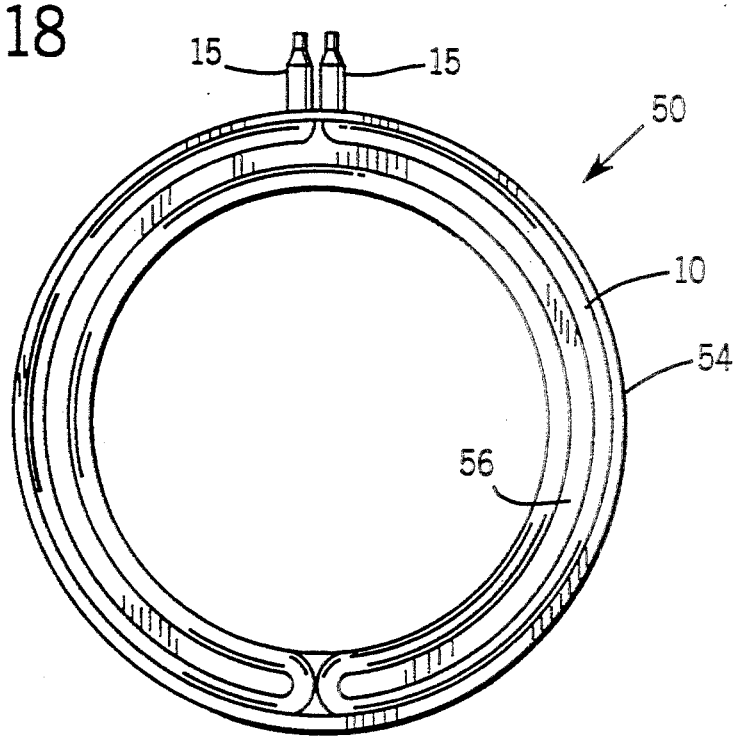
FIG. 18 is a front elevational view of the fusion ring of FIG. 17.

The welding ring 43 of FIG. 12 can be substituted for the welding rod 10 in the fusion ring 50 for larger diameter and/or thicker walled pipes. Alternatively, the welding rod 10 could be formed with a loop as shown in FIGS. 17 and 18. The fusion ring 50 shown in FIGS. 17 and 18 is formed by pre-attaching the welding rod 10 to a disc 56 of relatively thin thermoplastic material and subsequently attaching the disc 56 to the collar 54. The heat generated by this arrangement of the welding rod 10 sufficiently melts the thermoplastic material of the disc 56 as well as softening and melting the thermoplastic material of the pipes 51 and 52 adjacent the fusion ring 50.

Figure 19:
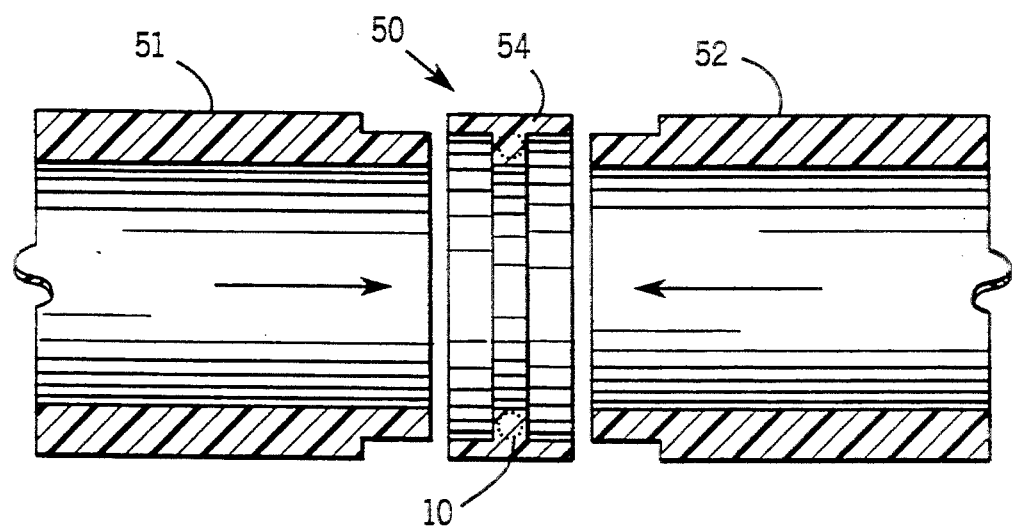
FIG. 19 is a cross-sectional view of FIG. 15 with a rabbet fitting of the pipe sections.

Referring now to FIG. 19, the fusion ring 50 may also be formed with a collar 54 of thermoplastic pipe having an outside diameter substantially equal to the outside diameter of the sections of pipe 51 and 52 being joined. The pipe sections 51 and 52 are rabbeted to a depth substantially equal to the wall thickness of the collar 54. This enables the joint between the sections of pipe 51 and 52 to be flush along the inside and outside surfaces of the pipe sections 51 and 52.

The welding rod 10 and process for electric fusion welding of the present invention is very versatile, providing a means for the welding together of different shapes and sizes of thermoplastic members, a number of which have been described herein. Because of this versatility, these welding operations can be carried out in otherwise less than ideal conditions underwater, in ponds, sewers, and the like. Under these conditions, allowances must be made for the dissipation of heat in the aqueous environment.

For example, in the case of the application shown in FIG. 14, the patch welding rod 45 is pre-attached to a thermoplastic sheet 44. To reduce the dissipation of heat through the aqueous environment, the pre-attached patch welding rod 45 is flattened by applying pressure and current to the patch welding rod 45. Flattening the patch welding rod 45 increases the contact area between the patch welding rod 45 and the thermoplastic member under repair (not shown). According, the heat generated in the resistance element 12 during the weld cycle evaporates any moisture remaining between the patch welding rod 45 and the thermoplastic member under repair.

The patch welding rod 45 is flattened after pre-attaching to the thermoplastic sheet 44, for example, by placing the thermoplastic sheet 44, path welding rod 45 side down, on a sheet of heat resistant glass. A weight, sufficient to cause flattening of the patch welding rod 45 in the softened state before burning of the thermoplastic sheet 44, is placed on top of the thermoplastic sheet 45. For example, the weight could be approximately 65 pounds for an 8 inch by 8 inch sheet of thermoplastic material. A current of 17 amperes is applied to the resistance element 12 for 2.5 minutes. The power is disconnected and the fused patch welding rod 45 and thermoplastic sheet 44 is left to cool with he weight applied for 2 minutes. The resulting patch has a flattened welding rod 45 with a smooth glass-like finish.

Figure 20:
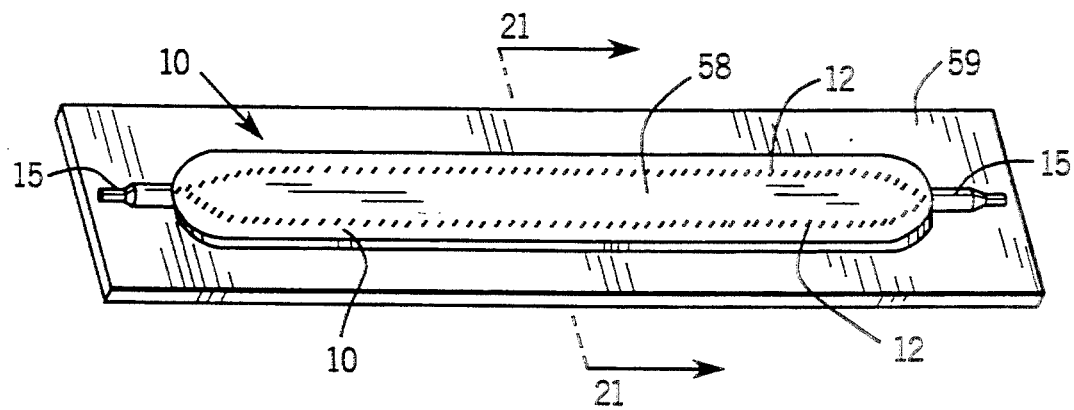
FIG. 20 is a perspective view of a flattened double welding rod.
Figure 21:
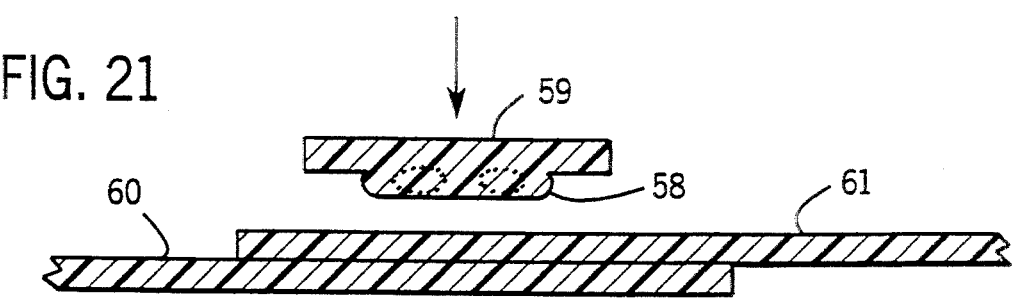
FIG. 21 illustrates the use of the flattened double welding rod of FIG. 20 to repair a seam between two thermoplastic sheets.

Referring now to FIGS. 20 and 21, there are also applications where a long thin patch is required, for example, to repair a faulty seam in a pond liner. In this case it is advisable to use a double welding rod 58.

The double welding rod 58 is formed as described in the discussion of the welding ring 43 and the patch welding rod 45. The resistance element 12 is exposed at each end of a pair of welding rods 10 of substantially equal length by heating and stripping the solid core 11 using, for example, a hot air gun and a pair of wire strippers. The exposed wires 17 of the resistance element 12 at a first end of the first welding rod 10 are then twisted together with he exposed wires 17 of the resistance element 12 at the first end of the second welding rod 10. The exposed wires 17 of the second ends of the first and second welding rods 10 are then twisted together to form a double welding rod 58. The two welding rods 10 are not separated but are pre-attached to the thermoplastic sheet 59 as previously discussed. The double welding rod 58 is flattened by the simultaneous application of pressure and current on a non-stick surface, such as heat resistant glass.

When the flattened patch welding rod 45 and double welding rod 58 are used to effect welds in an aqueous environment it is important to take into consideration the temperature of the environment, the buoyancy of the weight used to apply pressure, and the dissipation of heat through the aqueous environment. The flattened patch welding rod 45 and double welding rod 58 increase the contact area between the rods 45 and 58 and the thermoplastic member under repair (not shown). Accordingly, the heat generated in the resistance element 12 during the weld cycle evaporates any moisture remaining between the patch welding rod 45 and the thermoplastic member under repair.

FIG. 21 illustrates the use of the double welding rod 58 to repair a seam between two thermoplastic sheets 60 and 61. The heat generated by the resistance element 12 is sufficient to fuse the thermoplastic sheet 59, the double welding rod 58, and the two thermoplastic sheets 60 and 61 into a unitary structure. This type of patch repair is very strong and very effective.

The embodiments of the invention in which an exclusive property or privilege is claimed are defined as follows:

1. A welding rod for welding adjacent members of thermoplastic material, comprising a solid homogeneous core of thermoplastic material and a resistance element enveloping said core and embedded in said rod just below a thin thermoplastic surface layer of said rod, wherein said resistance element comprises a wire helically wound in a surrounding relationship about said core in the lengthwise direction of said rod, and wherein said resistance element is embedded in said rod below the surface of said rod a sufficient depth such that burning of said thermoplastic during welding is substantially prevented when a welding current is applied to the resistance element, but not so deep that burning of the thermoplastic material of the core occurs prior to softening of portions of the adjacent members nearest the welding rod.

2. The welding rod of claim 1, wherein said welding rod has a generally round shape in cross-section.

3. The welding rod of claim 2, wherein said welding rod is ring-shaped.

4. The welding rod of claim 1, wherein said resistance element comprises a plurality of wires wound in parallel about said core in a helical configuration, each wire being spaced from each other wire along the length of said welding rod.

5. The welding rod of claim 4, further comprising a pair of terminals at each end of said rod, said wires being connected to said terminals at opposite ends thereof.

6. The welding rod of claim 4, wherein said wires comprise fine metal wires, and said thermoplastic surface layer forms a thin sheath about said core and said wires.

7. The welding rod of claim 6, wherein said thermoplastic surface layer has helical indentations therein which match the shape of said helically wound wires.

8. The welding rod of claim 1, wherein said welding rod is configured to be flexible enough so that it can be bent and formed into a rounded shape that traces the outline of surfaces of the members to be welded.

9. The welding rod of claim 1, wherein said thermoplastic is high-density polyethylene.

10. The welding rod of claim 9, wherein said resistance element wire is made of stainless steel.

11. The welding rod of claim 1, wherein said resistance element wire is made of stainless steel.

12. The welding rod of claim 1, wherein said resistance element is a fine metal wire, and said thermoplastic surface layer forms a thin sheath about said core and said wire.

13. The welding rod of claim 12, wherein said thermoplastic surface layer has a helical indentation therein which matches the shape of said helically wound wire.

14. The welding rod of claim 1, wherein said welding rod is ring-shaped.

15. A double electric welding rod for welding adjacent members of thermoplastic material comprising:
a first welding rod and a second welding rod, each of said first and second welding rods comprising:
a solid homogeneous core of said thermoplastic material, a resistance element comprised of a plurality of electrically conductive wires wound around said solid core, said resistance element and said solid core being coated with a thin layer of said thermoplastic material to embed said resistance element just below the layer of thermoplastic material on said solid core, said resistance element at a first end of said first welding rod connected to said resistance element at a first end of said second welding rod, said resistance element at a second end of said first welding rod connected to said resistance element at a second end of said second welding rod, and said first welding rod distanced from said second welding rod between said first and said second ends.

16. The double welding rod according to claim 15 wherein said wires are helically wound around said cores.

* * * * *